July 17, 1928.
S. F. McDONALD
1,677,245
PROCESS OF PREPARING CAKE
Filed May 26, 1922
2 Sheets-Sheet 1
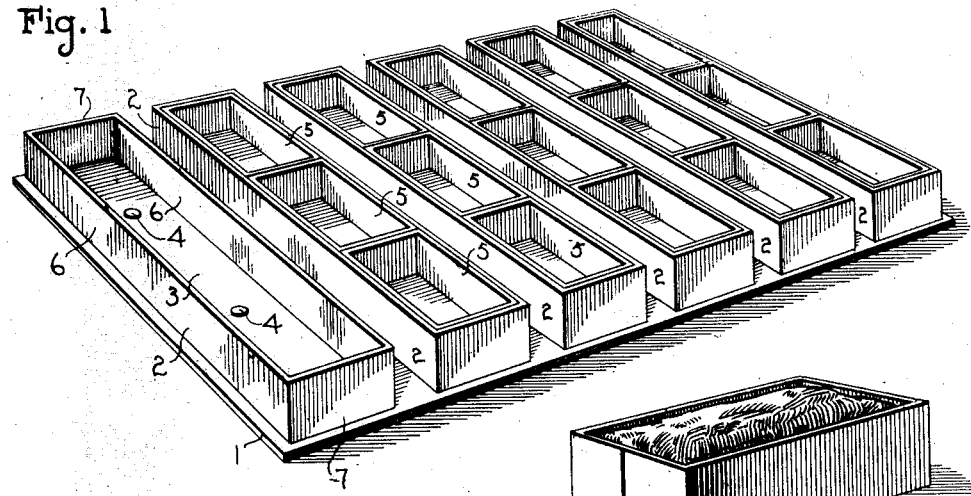
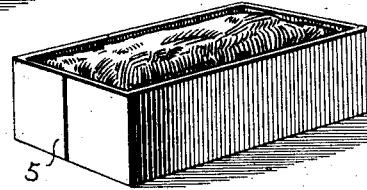
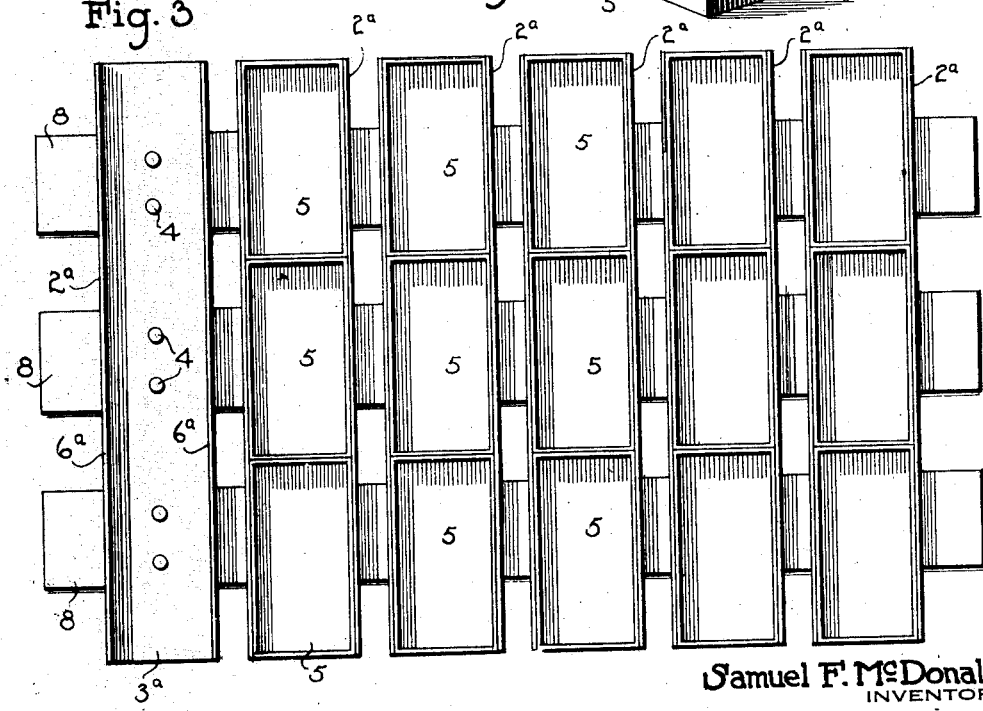
Samuel F. McDonald
INVENTOR
WITNESSES
BY
ATTORNEY July 17, 1928.　　　　　　　　　　　　　　　1,677,245
S. F. McDONALD
PROCESS OF PREPARING CAKE
Filed May 26, 1922　　　　2 Sheets-Sheet 2

Samuel F. McDonald
INVENTOR

Patented July 17, 1928.

1,677,245

UNITED STATES PATENT OFFICE.

SAMUEL F. McDONALD, OF MEMPHIS, TENNESSEE.

PROCESS OF PREPARING CAKE.

Application filed May 26, 1922. Serial No. 563,826.

This invention relates to baking devices.

It has been proposed to wrap cakes in waxed paper by machinery, but owing to the rough handling of the fragile cakes by the machine, the result was not satisfactory.

It is an object of this invention to provide a means for and a process of baking cakes in molds made of paper, cardboard or carton paper, which forms a protective means to prevent breaking of the baked cake when it is wrapped in waxed paper by machinery. The paper molds also aid in maintaining the cake intact after it is wrapped.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes or modifications mark no material departure from the salient features of the invention as expressed in the appended claim.

In the drawings:—

Fig. 1 is a view in perspective of my improved baking device provided with a plurality of paper molds having open tops;

Fig. 2 is a view in perspective of a mold with a cake ready for wrapping;

Fig. 3 is a plan view of a modified form of baking device supplied with molds having open tops;

Figure 4:
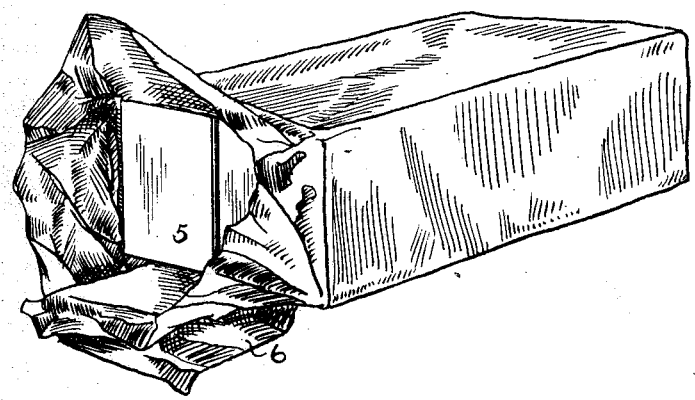
Figure 4 is a perspective view of the cake within the container partially wrapped.

Referring to the drawings, 1 designates a sheet of metal having elongated pans 2, holders or channels disposed transversely of the plate, with the bottoms 3 of the pans secured by means of rivets 4 to the plate. The pans are preferably arranged in parallel relation and spaced from each other at such a distance that when the baking device is employed in connection with a cake dough depositing machine, the machine will be able to properly deposit small quantities of dough in semi-cartons or molds 5 placed end to end in the pans or holders 2.

The pans 2 in Figure 1 have two opposite sides 6, and two ends 7 rising from the edges of the base member 3, or they may be left open at the ends as in Figure 3.

The semi-cartons form a container or mold for the cake dough and have an open top, the sides, ends and bottom of the cartons being adapted to adhere sufficiently to the baked cake to prevent ready disengagement of the cake and carton.

The carton may be made in any form or shape, and is preferably constructed of some cheap destructible material, such as paper, cardboard or carton paper, and which is discarded by the consumer after the cake has been removed.

These molds or semi-cartons may be cut and folded with locking flaps or the flaps may be otherwise fastened.

When desired, the pans or holders may have open ends, and instead of being secured to a flat plate as shown in Figure 1, they may be rigidly secured to flat spaced straps.

In the modification shown in Figure 3, the bottoms of the pans or channel members $2^a$ are rigidly secured transversely to spaced straps 8. These pans are spaced from each other at intervals which are equal to the spacing of the pans 2 of Figure 1. The pans or channel members $2^a$ have a base $3^a$ and sides $6^a$, the ends being open.

Each pan $2^a$, in a similar manner, is supplied with molds or semi-cartons 5, of the open type, in which cake dough is adapted to be deposited by a machine for that purpose. The channels $2^a$ and pans 2 may be of any appropriate length and be supplied with one long mold or a plurality of molds.

In the process of baking a cake in my improved baking device, the carton molds which are of semi-carton shape, may or may not be greased at the option of the operator before they are placed in position in the pans. The dough is then deposited in the molds by a cake dough depositing machine.

When the baking is complete, the cakes are removed with the carton mold adhering to the cake. The carton forms a protective casing for the fragile cake, whereby the cake may be readily wrapped in waxed paper by wrapping machines without the possibility of breakage, either during this operation or during any subsequent handling. The adhering mold is only removed by the consumer.

Figure 5:
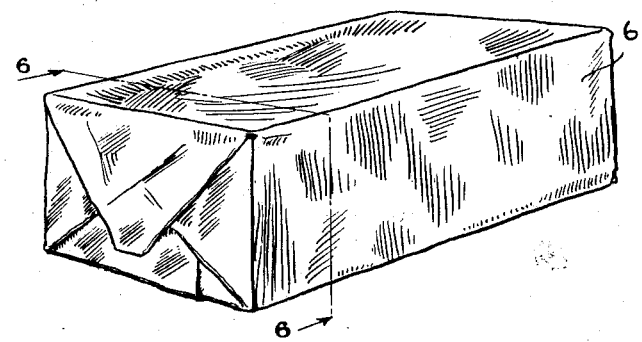
Figure 5 is a similar view showing the cake and container fully wrapped.
Figure 6:
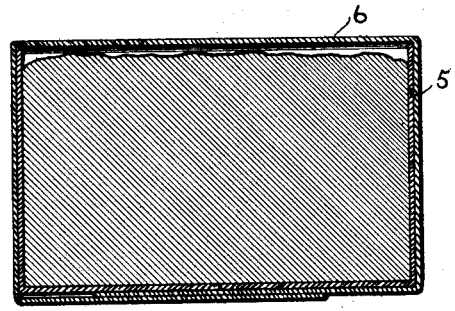
Figure 6 is a cross sectional view of Figure 5 taken on the line 6—6.

In Figures 4, 5 and 6 I have shown how the cake is wrapped, the mold shown in Figure 4 having the end divided and foldable and being covered by the wrapping 6.

The essential feature of the invention resides in the baking of the cake in a paper mold which forms a covering or protection for the cake until it reaches the consumer, it being noted that the pans or channels are substantially as deep as the paper molds or cartons so as to sustain the walls thereof during the baking process.

The utility of the process and apparatus is manifest. It reduces the cost of production and sale of what is commercially known as package or box cake; the cake is sold in its original package direct from the baking pans; the process is a sanitary one; and the freshness of the cake is preserved.

What is claimed is:—

The process of preparing mechanically wrapped cakes which consists in placing a mold of relatively stiff paper in a rigid container having walls conforming to the walls of the mold; filling the mold with dough; baking the dough therein; removing the baked cake with the mold adhering thereto from the rigid container; then completely wrapping the mold with the baked cake therein.

In testimony that I claim the foregoing as my own, I have hereto affixed my signature.

SAMUEL F. McDONALD.